United States Patent
Fritsch et al.

(10) Patent No.: US 8,551,433 B2
(45) Date of Patent: Oct. 8, 2013

(54) SCR CATALYST SYSTEM AND METHOD FOR THE OPERATION THEREOF

(75) Inventors: Andreas Fritsch, Waiblingen (DE); Andreas Holzeder, Zusmarshausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/618,904

(22) Filed: Sep. 14, 2012

(65) Prior Publication Data

US 2013/0115150 A1 May 9, 2013

(30) Foreign Application Priority Data

Nov. 8, 2011 (DE) .......................... 10 2011 085 952

(51) Int. Cl.
 *B01D 53/94* (2006.01)
 *F01N 3/24* (2006.01)
 *G05B 19/00* (2006.01)

(52) U.S. Cl.
 USPC ......... 423/213.2; 423/213.7; 60/295; 60/299; 60/301; 700/266

(58) Field of Classification Search
 USPC .................... 423/213.2, 213.7; 60/295, 299, 60/301; 700/266
 See application file for complete search history.

(56) References Cited

U.S. PATENT DOCUMENTS

| | | | |
|---|---|---|---|
| 7,546,728 B2 | 6/2009 | Ripper et al. | |
| 2010/0180579 A1* | 7/2010 | Huang et al. | 60/297 |
| 2011/0146237 A1* | 6/2011 | Adelmann et al. | 60/274 |
| 2012/0017568 A1* | 1/2012 | Geveci et al. | 60/274 |
| 2012/0023907 A1* | 2/2012 | Brahma et al. | 60/274 |
| 2013/0047583 A1* | 2/2013 | Driscoll et al. | 60/274 |
| 2013/0104530 A1* | 5/2013 | Geveci | 60/301 |

OTHER PUBLICATIONS

Troconi et al., "Unsteady Analysis of NO Reduction over Selective Catalyst Reduction—De-Nox Monolith Catalyst", Ind. Eng. Chem. Res. 1998, 37, 2341-2349.

* cited by examiner

*Primary Examiner* — Timothy Vanoy
(74) *Attorney, Agent, or Firm* — Michael Best & Friedrich LLP

(57) ABSTRACT

A SCR catalyst system, comprising a first SCR catalyst (1) and a second SCR catalyst (2) which is disposed in the exhaust gas tract downstream of the first SCR catalyst (1). At least one metering device (12) for metering in a reducing agent solution is disposed in the exhaust gas tract upstream of a first SCR catalysis element (13) of said first SCR catalyst (1). The SCR catalyst system does not require a device for metering a reducing agent solution into a second SCR catalysis element (21) of the second SCR catalyst (2).

9 Claims, 1 Drawing Sheet

SCR CATALYST SYSTEM AND METHOD FOR THE OPERATION THEREOF

BACKGROUND OF THE INVENTION

The present invention relates to a SCR catalyst system as well as to a method for operating said SCR catalyst system. The invention further relates to a computer program which carries out all of the steps of the method according to the invention if said program is executed on a computer or in a control device. Finally the invention relates to a computer program product with a program code, which is stored on a machine-readable carrier, for carrying out the method according to the invention if the program is executed on a computer or in a control device.

In order to comply with the increasingly stringent emission standard legislation (Euro 6, Tier 2 bin 5 and further emission guidelines), it is necessary to reduce nitrogen oxides or respectively nitric oxides ($NO_x$) in the exhaust gas of internal combustion engines, in particular diesel engines. To this end, it is known to dispose a SCR catalyst (Selective Catalytic Reduction) in the exhaust gas region of internal combustion engines, said catalyst reducing the nitrogen oxides contained in the exhaust gas of the combustion engine to nitrogen in the presence of a reducing agent. In so doing, the proportion of nitrogen oxides in the exhaust gas can be substantially reduced. During the course of the reduction of the nitrogen oxides, Ammonia ($NH_3$) is required that is added to the exhaust gas. For this purpose, $NH_3$ reagents or rather reagents which split of $NH_3$ are metered into the exhaust gas tract. In this case, an aqueous urea solution (UWS=urea-water solution) is used as a rule, which is injected into the exhaust gas tract upstream of the SCR catalyst. Ammonia forms from this solution which acts as the reducing agent. A 32.5% aqueous urea solution can be commercially obtained under the registered trade mark AdBlue®. In order to achieve high conversion rates of the nitrogen oxides to be reduced in a SCR catalyst system, the SCR catalyst has to be operated such that said catalyst is constantly filled to a certain level with the reducing agent. The German patent specification DE 10 2004 031 624 A1 describes, for example, how such a process control is set up for a SCR catalyst system on the basis of the ammonia fill level. The French patent specification FR 2 872 544 A1 describes a temperature-dependent, target filling level specification.

The SCR catalyst is generally implemented as a single component. Applications are however known in which the catalyst volume is, for example, divided into two housings for reasons of available space. In these applications, the two catalysts are nevertheless treated to the greatest extent as a single catalyst in terms of process control. Such SCR catalysts are in fact modeled in a partially location-discrete manner, for example in a plurality of recordings. These items of information are however bundled for the purpose of regulating the fill level, calculating the dosing quantities and the like; and in the end the method proceeds as in the case of a system having a single catalyst.

SUMMARY OF THE INVENTION

The SCR catalyst system according to the invention comprises a first SCR catalyst and a second SCR catalyst, which is disposed in an exhaust gas tract downstream of the first SCR catalyst. At least one metering device for metering a reducing agent solution is disposed in the exhaust gas tract upstream of a first SCR catalysis element of the first SCR catalyst. The SCR catalyst system does not have a device for metering a reducing agent solution into a second catalysis element of the second SCR catalyst. The catalytically active component of a SCR catalyst is understood according to the invention by the term SCR catalysis element. By the term SCR catalyst, a device is understood according to the invention, which comprises a catalyst housing, at least one SCR catalysis element as well as if applicable further components.

According to the invention, the first SCR catalysis element particularly relates to a catalysis element which is attached to a particle filter (SCRF=SCR on filter). Because no specific particle filter properties of the SCRF are used in the device according to the invention, said device can in fact also be configured having two consecutively disposed, conventional SCR catalysts.

The device according to the invention can be operated with the method according to the invention, which facilitates a good supply of reducing agent to the downstream second SCR catalyst while at the same time keeping the reducing agent slip downstream of the second SCR catalyst under control. A conversion rate of nitrogen oxides which is higher than is possible during a conventional operation of a SCR catalytic system, which comprises two SCR catalysts that are controlled as a single SCR catalyst, thus occurs simultaneously with low reducing agent slip.

In the method according to the invention, a quantity of reducing agent solution is metered into the first SCR catalysis element by means of the at least one metering device to the extent that a reducing agent slip, in particular a $NH_3$ slip, occurs in the first SCR catalysis element and a SCR reaction is carried out in the second SCR catalysis element, which facilitates the reaction of the reducing agent from the reducing agent slip of the first SCR catalysis element with at least one nitrogen oxide. According to the invention, the first SCR catalyst is therefore operated like a reducing agent source. In so doing, a reducing agent filling level of the first SCR catalysis element is preferably set by a slip regulator in a control device such that the second SCR catalytic converter is continuously supplied with reducing agent from the reducing agent slip of said first SCR catalysis element. Depending upon the requirements, the reducing agent filling level of said first SCR catalysis element is preferably set slightly above or slightly below the slip limit. To this end, information can be deposited in a model as to how much reducing agent is to be expected in accordance with the current and possible operating conditions of said first SCR catalysis element. The conversion of nitrogen oxides can thereby be maximized because on the one hand said first SCR catalysis element is operated with a very high reducing agent filling level and on the other hand the second SCR catalysis element is optimally supplied with reducing agent. The process control of the second SCR catalyst can furthermore be performed in a known manner like in systems having a single SCR catalyst. The reducing agent metering point is now only the first SCR catalyst and no longer a UWS metering valve. This simplifies the transition from a SCR catalyst system comprising one SCR catalyst to a system comprising two SCR catalysts. By modeling the reducing agent content downstream of the first SCR catalyst, the adjustment can take place with an optional ammonia sensor downstream of the first SCR catalyst in order to adjust the model, adapt a sensor tolerance and if need be to monitor the system. The modeling of SCR catalysts can, for example, take place by means of data-based models or respectively characteristic diagram models. Known models can however also be taken from the technical literature (for example E. Tronconi, A. Cavanna, P. Forzatti, "Unsteady Analysis of NO Reduction over Selective Catalyst Reduction—De-Nox Monolith Catalyst", Ind. Eng. Chem. Res. 1998, 37, 2341-

2349). These models can be implemented in control units of modern motor vehicles and map the $NO_x$ conversion of a SCR catalyst as well as the $NH_3$ slip thereof.

According to the invention, different alternatives are available for controlling the reducing agent slip in the first SCR catalysis element. A first target filling level characteristic curve above a reducing agent slip limit of the first SCR catalysis element can be deposited in the slip regulator as a function of the temperature. A second target filling level characteristic curve is then deposited below the reducing agent slip limit. The reducing agent target filling level of the first SCR catalysis element is determined in this case from the first target filling level characteristic curve when a reducing agent quantity is requested by the second SCR catalyst below an applicable threshold value. When a reducing agent quantity is requested by the second SCR catalyst above the applicable threshold value, the reducing agent target filling level of the first SCR catalysis element is determined from the second target filling level characteristic curve. A third target filling level characteristic curve can also be optionally deposited on the reducing agent slip limit. When in this case a reducing agent quantity is requested by the second SCR catalyst below a first applicable threshold value, the reducing agent target filling level of the first catalysis element is determined from the first target filling level characteristic curve. When a reducing agent quantity is requested by a second SCR catalyst above the first applicable threshold value and below a second applicable threshold value, the reducing agent target filling level of the first SCR catalysis element is determined from the third target filling level characteristic curve. When a reducing agent quantity is requested by a second SCR catalyst above the second applicable threshold value, the reducing agent fill level of the first SCR catalysis element is determined from the second target filling level characteristic curve. In place of target filling level characteristic curves, characteristic diagrams or target filling level structures, for example a characteristic diagram comprising a downstream, exponential ambient temperature correction, can be switched between. It is thereby possible in the case of switching controllers to provide the switching thresholds with a hysteresis or debounce time, to take the gradient into account, with which the requested variable moves onto the switching threshold or to smooth out the transitions by means of ramps or signal fields.

According to the invention, it is also possible for a first target filling level characteristic curve above a reducing agent slip limit of the first SCR catalysis element to be deposited in the slip regulator as a function of the temperature of the first SCR catalyst, for a second target filling level curve below the reducing agent slip limit to be deposited in said slip regulator as a function of said temperature of the first SCR catalyst and optionally for a third target filling level characteristic curve on the reducing agent slip limit to be deposited in said slip regulator as a function of said temperature of the first SCR catalyst. A continuous control of the reducing agent filling level of the first SCR catalysis element thus results by a target filling level being extrapolated between the target filling level characteristic curves when a reducing agent quantity is requested by the second SCR catalyst. A continuous regulator of this kind can be even further simplified by said regulator preferably adding an offset to the target filling level or multiplying the target filling level by a factor.

According to the invention, it is furthermore possible for the reducing agent target filling level of the first SCR catalysis element to be calculated as a function of: a request of a reducing agent quantity by the second SCR catalyst, the space velocity of the exhaust gas in the first SCR catalyst, the conversion efficiency of the first SCR catalysis element, i.e. the conversion efficiency with respect to the individual nitrogen oxide constituents, the temperature of the first SCR catalyst and the reducing agent filling level of the first SCR catalysis element. It is hereby possible to use either the current values or target values, respectively average values, which have occurred empirically in the system, for the time-variant variables: space velocity, filling level, temperature and conversion efficiency. Depending upon thermal inertia and the size of the reducing agent filling level, the one or other option can lead to better results. Both options can also be combined in accordance with the invention. According to the invention, target trajectories can be specified for the reducing agent filling level. Using said trajectories, the final state of said filling level is achieved in a predeterminable time and in a predeterminable course.

The inventive computer program can carry out all steps of the method according to the invention if said program is executed on a computer or in a control device. This makes it possible for different embodiments of the inventive method to be implemented in the inventive device without having to perform structural changes to said device. In this respect, the inventive computer program product including program code, which is stored on a machine-readable carrier, can carry out the method according to the invention if the program is executed on a computer or in a control device.

BRIEF DESCRIPTION OF THE DRAWINGS

Exemplary embodiments of the invention are depicted in the drawings and explained in detail in the following description.

DETAILED DESCRIPTION

Figure 1:
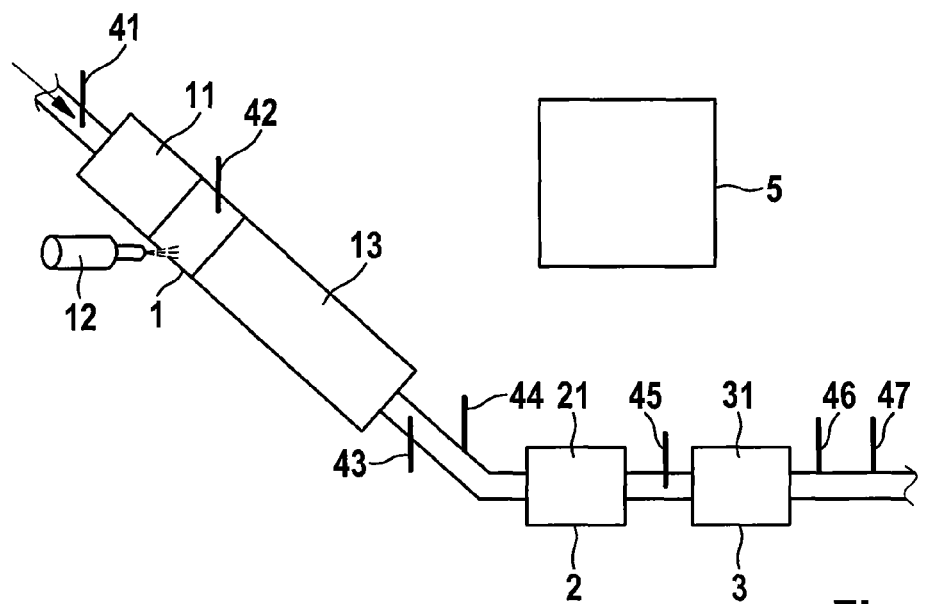
FIG. 1 shows a SCR catalyst system according to one embodiment of the invention.

FIG. 1 shows an embodiment of the SCR catalyst system according to the invention, which is particularly suitable for disposal in the exhaust gas tract of a diesel powered motor vehicle. The direction of the exhaust gas flow is designated in FIG. 1 by an arrow. Three catalysts 1, 2, 3 are consecutively disposed in the exhaust gas tract in the direction of flow. The first catalyst relates to a SCR catalyst 1 which has a diesel oxidation catalyst (DOC) 11 at the ingress thereof. A metering module 12, which is designed to meter a urea-water solution into the exhaust gas, is disposed in the housing of the SCR catalyst downstream of the DOC 11. A first SCR catalysis element 13, which consists of a particle filter having a SCR coating (SCRF), is disposed downstream of the aforementioned metering point. The second catalyst relates to a second SCR catalyst 2 which contains a second SCR catalysis element 21. The third catalyst relates to a clean-up catalyst 3 which contains a CUC catalysis element 31. A first nitrogen oxide sensor 41 is disposed upstream of the first SCR catalyst 1. Further nitrogen oxide sensors 44 and 46 are disposed between the two SCR catalysts and downstream of the clean-up catalyst 3. An ammonia sensor 43 is furthermore disposed between the two SCR catalysts 1, 2. Three temperature sensors 42, 45, 47 are disposed between the DOC 11 and the first SCR catalysis element 13, between the second SCR catalyst 2 and the clean-up catalyst 3 as well as downstream of said clean-up catalyst 3. The temperature sensor 42 in the first SCR catalyst 1 can provide an input variable for a temperature model of the first SCR catalysis element. A control device 5 is connected (connections not shown) to the catalysts 1, 2, 3 and to the sensors 41, 42, 43, 44, 45, 46, 47. The position, type and number of the indicated sensors are provided purely by way of example and are not of significance to the invention. The DOC 11 and the clean-up catalyst 3, which are depicted, likewise are not of significant importance to the invention. They are useful in this embodiment, can however be differently disposed or omitted.

Figure 2:
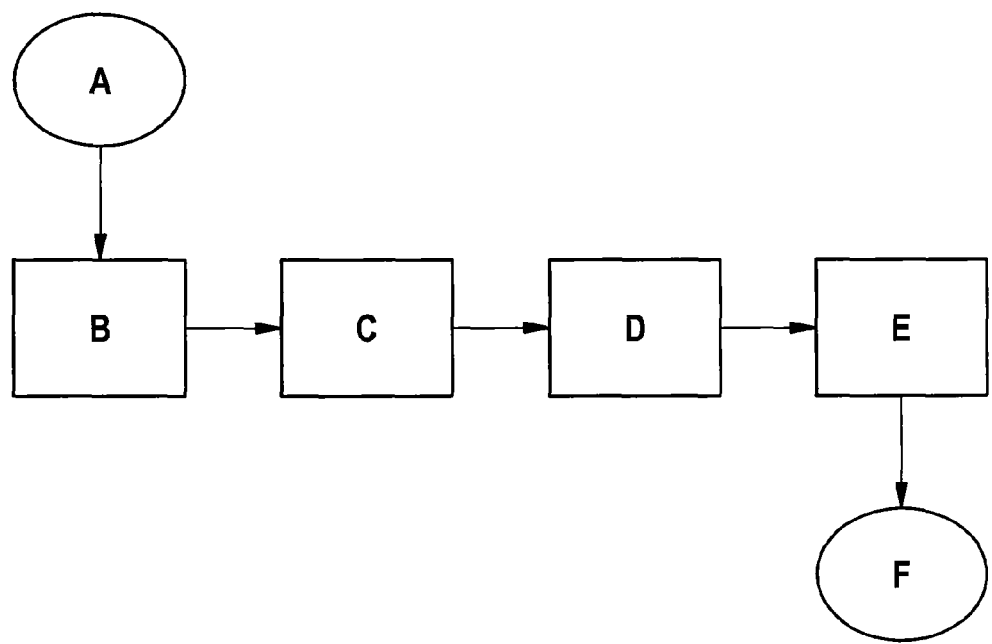
FIG. 2 shows a process diagram of an embodiment of the method according to the invention.

FIG. 2 depicts a process diagram of a method according to one embodiment of the invention. The first catalyst 1 is operated using a metering strategy according to the prior art. Different values A which are present on the input side, as for example nitrogen oxide and ammonia concentrations as well as nitrogen oxide and ammonia mass flows in the exhaust gas, the exhaust gas mass flow and other required variables, are obtained from models or sensors. Said values A, which are used for pilot control, modeling and reducing agent filling level regulation, are provided to the process control B of the first SCR catalyst 1. A desired ammonia mass flow, which is determined in the same manner as is known for SCR catalysts of the prior art, results from said process control B. Said ammonia mass flow is then passed on in step C to a slip regulator of the first SCR catalyst 1. In step D, said desired mass flow is processed in the slip regulator. Said slip regulator has the task of adapting the reducing agent target filling level of the first SCR catalysis element 13 such that at least on average the desired ammonia slip results from the first SCR catalysis element 13. Said reducing agent target filling level of the first catalysis element 13 is inputted into the process control of the first SCR catalyst 1 in step E. As a result of this action, the currently applicable reducing agent target filling level for the first SCR catalysis element 13 is provided as value F. Said value F is then set by a target filling level regulator and a corresponding amount of urea-water solution is metered via the metering device 12 into the exhaust gas tract upstream of the first SCR catalysis element 13 in the SCR catalyst 1. In contrast to known process controls, the requested metering quantity is preferably limited in the inventive method in order to take the hydrolysis limit of the first SCR catalysis element 13 into account in the case of reducing agent filling levels of said first SCR catalysis element 13 which are expected to be high. For this purpose, known hydrolysis models can be used in the limitation process.

The invention claimed is:

1. An SCR catalyst system, comprising a first SCR catalyst and a second SCR catalyst which is disposed in an exhaust gas tract downstream of the first SCR catalyst, wherein at least one metering device for metering in a reducing agent solution is disposed in the exhaust gas tract upstream of a first SCR catalysis element of said first SCR catalyst and the SCR catalyst system does not have a device for metering a reducing agent solution into a second catalysis element of the second SCR catalyst, wherein the first SCR catalysis element is attached to a particle filter.

2. A method for operating an SCR catalyst system according to claim 1, characterized in that a quantity of a reducing agent solution is metered into the first SCR catalysis element by means of the at least one metering device to such an extent that a reducing agent slip occurs in said first SCR catalysis element, and an SCR reaction is carried out in the second SCR catalysis element, said SCR reaction facilitating the reaction of the reducing agent from the reducing agent slip of the first SCR catalysis element with at least one nitrogen oxide.

3. The method according to claim 2, characterized in that a reducing agent filling level of the first SCR catalysis element is set by a slip regulator in a control device such that the second SCR catalyst is continuously supplied with reducing agent from the reducing agent slip of said first SCR catalysis element.

4. The method according to claim 3, characterized in that a first target filling level characteristic curve above a reducing agent slip limit of the first SCR catalysis element is deposited in the slip regulator as a function of the temperature of the first SCR catalyst, and a second target filling level characteristic curve below the reducing agent slip limit is deposited in said slip regulator, and
the reducing agent target filling level of the first SCR catalysis element is determined from the first target filling level characteristic curve when a reducing agent quantity is requested by the second SCR catalyst below an applicable threshold value, and
the reducing agent target filling level of the first SCR catalysis element is determined from the second target filling level characteristic curve when a reducing agent quantity is requested by the second SCR catalyst above the applicable threshold value.

5. The method according to claim 3, characterized in that a first target filling level characteristic curve above a reducing agent slip limit of the first SCR catalysis element is deposited in the slip regulator as a function of the temperature of the first SCR catalyst, a second target filling level characteristic curve below the reducing agent slip limit is deposited in said slip regulator and a third target filling level characteristic curve on the reducing agent slip limit is deposited therein, and
the reducing agent target filling level of the first SCR catalysis element is determined from the first target filling level characteristic curve when a reducing agent quantity is requested by the second SCR catalyst below a first applicable threshold value,
the reducing agent target filling level of the first catalysis element is determined from the third target filling level characteristic curve when a reducing agent quantity is requested by the second SCR catalyst above the first applicable threshold value and below a second applicable threshold value, and
the reducing agent target filling level of the first SCR catalysis element is determined from the second target filling level characteristic curve when a reducing agent quantity is requested by the second SCR catalyst above the second applicable threshold value.

6. The method according to claim 3, characterized in that a first target filling level characteristic curve above a reducing agent slip limit of the first SCR catalysis element is deposited in the slip regulator as a function of the temperature of the first SCR catalyst, a second target filling level characteristic curve below the reducing agent slip limit is deposited in said slip regulator and optionally a third target filling level characteristic curve on the reducing agent slip limit is deposited therein, and a continuous control of the reducing agent filling level of the first SCR catalysis element results by a target filling level being extrapolated between the target filling level characteristic curves when a reducing agent quantity is requested by the second SCR catalyst.

7. The method according to claim 3, characterized in that the reducing agent target filling level of the first SCR catalysis element is calculated as a function of: a request for a reducing agent quantity by the second SCR catalyst, the space velocity of the exhaust gas in the first SCR catalyst, the conversion efficiency of the first SCR catalysis element, the temperature of the first SCR catalyst and the reducing agent filling level of the said SCR catalysis element.

8. A computer program which executes all of the steps of a method according to claim 2 if said program is run on a computer or in a control device.

9. A computer program product with a program code, which is stored on a machine-readable carrier, for carrying out the method according to claim 2 if the program is executed on a computer or in a control device.

* * * * *